US006738642B1

United States Patent
Tsukamoto

(10) Patent No.: US 6,738,642 B1
(45) Date of Patent: May 18, 2004

(54) COMMUNICATION DEVICE AND METHOD OF OPERATING COMMUNICATION DEVICE

(75) Inventor: Tadashi Tsukamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/546,825

(22) Filed: Apr. 11, 2000

(30) Foreign Application Priority Data

Apr. 13, 1999 (JP) .......................................... 11-105921

(51) Int. Cl.⁷ ................................................ H04B 1/38
(52) U.S. Cl. ................... 455/550; 455/575.1; 455/90.1; 455/566
(58) Field of Search ................................ 455/550, 575, 455/90, 566, 575.1, 90.1, 575.2–575.8; 345/167, 184

(56) References Cited

U.S. PATENT DOCUMENTS

| 5,436,954 A | * | 7/1995 | Nishiyama et al. | .......... 455/550 |
| 6,198,948 B1 | * | 3/2001 | Sudo et al. | .................... 455/90 |
| 6,351,657 B2 | * | 2/2002 | Yamada | ....................... 455/566 |

FOREIGN PATENT DOCUMENTS

| EP | 0175176 | 3/1986 | | |
| EP | 0254966 | 2/1988 | | |
| JP | 7-220552 | 8/1994 | | |
| JP | WO95/31863 | 11/1995 | | |
| JP | 00755142 A2 | * | 7/1996 | .......... H04M/1/274 |
| JP | 10-27530 | 1/1998 | | |
| JP | 10-28166 | 1/1998 | | |
| JP | 10-65786 | 3/1998 | | |
| JP | 11-8686 | 1/1999 | | |
| JP | 11-275192 | 10/1999 | | |

* cited by examiner

Primary Examiner—Quochien B. Vuong
Assistant Examiner—Lana Le
(74) Attorney, Agent, or Firm—Scully, Scott, Murphy & Presser

(57) ABSTRACT

There is provided a communication device including (a) a device body, (b) an operator formed with the device body, (c) a displaceable section which is displaced by the operator, (d) a displacement detector which transmits a control signal in accordance with displacement of the displaceable section, and (e) a controller which operates the communication device in accordance with the control signal. For instance, when the communication device includes a display screen, and the controller changes what is displayed in the display screen, in accordance with the control signal. The communication device provides enhanced operability in comparison with a conventional communication device.

81 Claims, 6 Drawing Sheets

COMMUNICATION DEVICE AND METHOD OF OPERATING COMMUNICATION DEVICE

BACKGROUND OF THE INVENTION

1. Field of the Invention

The invention relates to a communication device such as a cellular phone, and a method of operating a communication device.

2. Description of the Related Art

Data can be input into a communication device such as a cellular phone in several ways. A conventional cellular phone is generally designed to have keys in a front thereof Various functions of a cellular phone are assigned to the keys. A user can select a desired function of a cellular phone by pushing a key associated with the desired function.

Apart from the above-mentioned example, data can be input into a cellular phone as follows.

FIG. 1 illustrates a first example of a cellular phone. The illustrated cellular phone has number keys 81 on a front thereof Various functions are assigned to the number keys 81. A user can select a desired function of the cellular phone by pushing two or more of the number keys 81 in combination.

FIG. 2 illustrates a second example of a cellular phone. The illustrated cellular phone has an operation key 91 on a front thereof By pushing the operation key 91 at an upwardly directed arrow, what is displayed in a display screen 92 is upwardly scrolled, and by pushing the operation key 91 at a downwardly directed arrow, what is displayed in the display screen 92 is downwardly scrolled.

FIG. 3 illustrates a third example of a cellular phone. The illustrated cellular phone has an operation dial 101 at a left side of the cellular phone. By rotating the operation dial 101, what is displayed in a display screen 102 can be scrolled.

However, the above-mentioned conventional cellular phones are accompanied with the following problems.

In the first example illustrated in FIG. 1, it is assumed that combinations of the number keys 81 are known to a user, because various functions of the cellular phone are assigned to such combinations. Accordingly, a user has to memorize combinations of the number keys 81, or refer to a function table indicative of correspondence between functions of the cellular phone and combinations of the number keys 81, each time he/she makes a call.

In the first and second examples illustrated in FIGS. 1 and 2, respectively, the cellular phones are held by a user with fingers indicated with broken lines. Hence, when the number keys 81 or the operation key 91 is to be operated, a user has to take his/her thumb off the cellular phone, and operate the number key 81 or the operation key 91 with his/her thumb 93 in such a manner as illustrated in FIG. 2. As an alternative, a user has to operate the number key 81 or the operation key 91 with the other hand (not illustrated). Thus, a user is laborious in either way.

In the third example illustrated in FIG. 3, the operation dial 101 is positioned so that the operation dial 101 can be operated with either a thumb 103 when a user holds the cellular phone with his/her left hand or a forefinger (not illustrated) when a user holds the cellular phone with his/her right hand.

However, the operation dial 101 is designed such that it can be readily operated with a thumb 103 of a user. Hence, when the operation dial 101 is arranged at a left side of the cellular phone as illustrated in FIG. 3, the operation dial 101 can be readily operated with a left hand of a user, which means that the operation dial 101 is operated with some difficulty when it is operated with a right hand of a user.

In addition, in the first to third examples illustrated in FIGS. 1 to 3, a user is required to push the keys 81 or 91, or rotate the operation dial 101 many times until he/she can retrieve or select a desired function. This is somewhat laborious to a user.

Japanese Unexamined Patent Publication No. 7-220552 has suggested a switch to be used for an electronic device, comprising a portion rotatable for switching connections, a second portion fixed on a supporter, and a switch knob mounted on the second portion by means of assembly means and fastener means.

Japanese Unexamined Patent Publication No. 10-65786 has suggested a portable radio-signal communication device including a rotary dial formed at a side of a device body. The rotary dial is designed to be rotatable about a rotation shaft, and is supported such that the rotary dial together with the rotation shaft can be pushed into the device. When the rotary dial is pushed into the device, the communication device is put into a mode for inputting data thereinto. A desired alphabet is selected by rotating the rotary dial. Since the rotary dial is arranged at a side of a device body, a user can operate the rotary dial with slight movement of a finger or fingers. The rotary dial slightly extends beyond a side of the device body so as not to interfere with a user's face while he/she is making a call.

Japanese Unexamined Patent Publication No. 10-28166 has suggested a method of inputting data into a cellular phone. In accordance with the method, data associated with telephone numbers can be displayed at a display screen at the first and second orders by operating an operator arranged at a side of a device body. Then, data displayed at the display screen is input into the cellular phone by further operating the operator. The operator includes a rotary member rotatable about a rotation axis. By rotating the rotary member in a first direction, data is displayed at the display screen at the first order, and by rotating the rotary member in a second direction which is opposite to the first direction, data is displayed at the display screen at the second order. By pushing the operator down, data displayed at the display screen is input into the cellular phone.

Japanese Unexamined Patent Publication No. 11-8686 has suggested a telephone including a knob arranged in parallel with a display screen, a detector which detects a direction in which the knob rotates, and a controller which displays data about telephone numbers stored therein, at the display screen in accordance with results of the detection of the detector.

The international publication WO95/31863 has suggested a terminal communication device including a rectangular parallelopiped body having a radio-displacement detector and a radio-signal receiver, and an operator. The body has a straight portion defining a side of the body, and a projecting portion outwardly projecting beyond the straight portion and formed integral with the straight portion. The operator is formed at the projecting portion, and includes a single operation member movable in positive and negative directions. The operator inputs data into the radio-displacement detector and receiver, and switches operation between the radio-displacement detector and receiver. The projecting portion has an arcuate surface extending beyond the side of the body. The single operation member is comprised of a rotary member rotatable relative to the body.

SUMMARY OF THE INVENTION

In view of the above-mentioned problem of the prior art, it is an object of the present invention to provide a communication device which can be operated well with either a right or left hand of a user to thereby enhance operability thereof.

In one aspect of the present invention, there is provided a communication device including (a) a device body, (b) an operator formed with the device body, (c) a displaceable section which is displaced by the operator, (d) a displacement detector which transmits a control signal in accordance with displacement of the displaceable section, and (e) a controller which operates the communication device in accordance with the control signal.

For instance, the controller may be designed to select one of functions of the communication device in accordance with the control signal.

It is preferable that the communication device further includes a display screen formed with the body, in which case, the controller may change what is displayed in the display screen, in accordance with the control signal.

It is preferable that the communication device includes two operators which are formed at opposite sides of the communication device.

It is preferable that the displacement detector keeps transmitting the control signal while the displaceable section is kept displaced.

It is preferable that the displacement of the displaceable section is comprised of at least one of a degree of expansion or contraction, a degree of deformation, a degree of angular displacement, and a degree of torsion.

It is preferable that the displacement detector transmits the control signal in accordance further with a direction in which the displaceable section is displaced.

It is preferable that the communication device further includes a converter which converts the displacement of the displaceable section into electric energy.

It is preferable that the displaceable section is composed of elastic material deformable by the operator.

It is preferable that the displacement detector transmits first to N-th control signals in accordance with the displacement of the displaceable section, wherein N is an integer equal to or greater than 2, the controller operating the communication device at first to N-th rates in response to the first to N-th control signals, respectively.

It is preferable that the operator is designed to be rotatable relative to the device body and to extend beyond opposite sides of the device body.

It is preferable that wherein the communication device includes two operators having arcuate surfaces symmetrical with each other about a center of the device body.

It is preferable that the operator includes a non-displaceable section which is not displaced by the operator, the communication device further including a deformation detector which is connected to both of the displaceable section and the non-displaceable section to thereby detect deformation of the displaceable section and transmit a detection signal in accordance with the thus detected deformation, the displacement detector transmitting the control signal in accordance with the detection signal.

It is preferable that the communication device includes two deformation detectors located horizontally symmetrical with each other about a center of the device body.

It is preferable that the communication device includes four deformation detectors located horizontally and vertically symmetrical with one another about a center of the device body.

It is preferable that the displacement detector includes a sensor having a wheatstone bridge structure.

It is preferable that the operator is formed integral with the device body.

There is further provided a communication device including (a) a device body, (b) at least one operator having an outer arcuate surface partially extending beyond the device body, and rotatable relative to the device body, (c) a displaceable section which is displaced by the operator, (d) a displacement detector which detects displacement of the displaceable section and transmits a detection signal accordingly, and (e) a controller which operates the communication device in accordance with the detection signal.

It is preferable that the communication device further includes a supporter fixed to the device body and having an arcuate outer surface having the same curvature as a curvature of an inner arcuate surface of the operator, the supporter supporting the operator thereon for rotation.

It is preferable that the device body is formed with a cut-out having an inner arcuate surface having the same curvature as a curvature of the outer arcuate surface of the operator, the outer arcuate surface of the operator being in facing relation to the inner arcuate surface of the cut-out.

It is preferable that the displacement detector includes (a) a non-deformable portion fixed to the device body, (b) an deformable portion connecting the non-deformable portion to the operator, and (c) a deformation detecting device located across the non-deformable portion and the deformable portion for detecting a degree of deformation of the deformable portion.

It is preferable that the displacement detector further includes an auxiliary deformable portion connecting the non-deformable portion to the operator, the deformable portion connecting to the non-deformable portion at one of upper and lower edges of the non-deformable portion, the auxiliary deformable portion connecting to the non-deformable portion at the other edge of the non-deformable portion.

It is preferable that the communication device further includes a second deformation detecting device located across the non-deformable portion and the auxiliary deformable portion for detecting a degree of deformation of the auxiliary deformable portion.

It is preferable that the communication device further includes a display screen formed with the body, and wherein the controller changes what is displayed in the display screen, in accordance with the detection signal.

It is preferable that the displacement detector keeps transmitting the detection signal while the displaceable section is kept displaced.

It is preferable that the displacement detector transmits the detection signal in accordance further with a direction in which the displaceable section is displaced.

It is preferable that the displacement detector transmits first to N-th detection signals in accordance with the displacement of the displaceable section, wherein N is an integer equal to or greater than 2, the controller operates the communication device, at first to N-th rates in response to the first to N-th detection signals, respectively.

It is preferable that the displacement detector transmits first to N-th detection signals in accordance with the displacement of the displaceable section, wherein N is an integer equal to or greater than 2, the controller changes what is displayed in the display screen at first to N-th rates in response to the first to N-th detection signals, respectively.

It is preferable that the displacement detector includes a sensor having a wheatstone bridge structure.

It is preferable that the displacement detector transmits the detection signal only when the displacement of the displaceable section is equal to or greater than a threshold displacement.

There is still further provided a communication device including (a) a device body, (b) a first operator having an outer arcuate surface partially extending beyond the device body, and rotatable relative to the device body, (c) a second operator having an outer arcuate surface partially extending beyond the device body, and rotatable relative to the device body, the first and second operators being formed at opposite sides of the communication device, (d) a first displaceable section which is displaced by the first operator, (e) a second displaceable section which is displaced by the second operator, (f) a first displacement detector which detects displacement of the first displaceable section and transmits a first detection signal accordingly, (g) a second displacement detector which detects displacement of the second displaceable section and transmits a second detection signal accordingly, and (h) a controller which operates the communication device in accordance with at least one of the first and second detection signal.

It is preferable that the first and second operators rotate in synchronization with each other.

It is preferable that the first operator rotates in a direction opposite to a direction in which the second operator rotates.

It is preferable that the first and second operators are rotatable independently of each other.

It is preferable that the communication device further includes first and second supporters fixed to the device body and each having an arcuate outer surface having the same curvature as a curvature of an inner arcuate surface of each of the first and second operators, the first and second supporters supporting the first and second operators thereon for rotation, respectively.

It is preferable that the device body is formed with first and second cut-outs each having an inner arcuate surface having the same curvature as a curvature of the outer arcuate surface of each of the first and second operators, the outer arcuate surface of each of the first and second operators being in facing relation to the inner arcuate surface of each of the first and second cut-outs, respectively.

It is preferable that the communication device further includes a non-deformable portion fixed to the device body, the first displaceable section being connected to both the first operator and the non-deformable portion, the second displaceable section being connected to both the second operator and the non-deformable portion, the first displacement detector being located across the non-deformable portion and the first displaceable section, the second displacement detector being located across the non-deformable portion and the second displaceable section.

It is preferable that the communication further includes a first auxiliary displaceable section being connected to both the first operator and the non-deformable portion, and a second auxiliary displaceable section being connected to both the second operator and the non-deformable portion.

It is preferable that the first displaceable section is connected to the non-deformable portion at one of upper and lower edges of the non-deformable portion, and the first auxiliary displaceable section is connected to the non-deformable portion at the other edge of the non-deformable portion, and wherein the second displaceable section is connected to the non-deformable portion at one of upper and lower edges of the non-deformable portion at the opposite side to the first displaceable section, and the second auxiliary displaceable section is connected to the non-deformable portion at the other edge of the non-deformable portion at the opposite side to the first auxiliary displaceable section.

It is preferable that the communication device further includes a third displacement detector which detects displacement of the first auxiliary displaceable section and transmits a third detection signal accordingly, and a fourth displacement detector which detects displacement of the second auxiliary displaceable section and transmits a fourth detection signal accordingly.

It is preferable that the communication device further includes a display screen formed with the body, and wherein the controller changes what is displayed in the display screen, in accordance with at least one of the first and second detection signals.

It is preferable that the first and second displacement detector keep transmitting the first and second detection signals while the first and second displaceable sections are kept displaced.

It is preferable that the first and second displacement detectors transmit the first and second detection signals in accordance further with directions in which the first and second displaceable sections are displaced.

It is preferable that the third and fourth displacement detectors transmit the third and fourth detection signals in accordance further with directions in which the third and fourth displaceable sections are displaced.

It is preferable that each of the first and second displacement detectors transmits first to N-th detection signals in accordance with the displacement of each of the first and second displaceable sections, respectively, wherein N is an integer equal to or greater than 2, the controller operates the communication device at first to N-th rates in response to the first to N-th detection signals, respectively.

It is preferable that each of the first and second displacement detectors transmits first to N-th detection signals in accordance with the displacement of each of the first and second displaceable sections, respectively, wherein N is an integer equal to or greater than 2, the controller changes what is displayed in the display screen, at first to N-th rates in response to the first to N-th detection signals, respectively.

It is preferable that each of the first and second displacement detectors includes a sensor having a wheatstone bridge structure.

It is preferable that each of the first and second displacement detector transmits the detection signal only when the displacement of each of the first and second displaceable sections is equal to or greater than a threshold displacement.

There is yet further provided a communication device including (a) a device body, (b) at least one operator slidable relative to the device body, (c) a displaceable section which is displaced by the operator, (d) a displacement detector which detects displacement of the displaceable section and transmits a detection signal accordingly, and (e) a controller which operates the communication device in accordance with the detection signal.

There is still yet further provided a communication device including (a) a device body, (b) a first operator slidable relative to the device body, (c) a second operator slidable relative to the device body, the first and second operators being formed at opposite sides of the communication device, (d) a first displaceable section which is displaced by the first operator, (e) a second displaceable section which is displaced by the second operator, (f) a first displacement detector which detects displacement of the first displaceable section and transmits a first detection signal accordingly, (g) a second displacement detector which detects displacement of the second displaceable section and transmits a second detection signal accordingly, and (h) a controller which operates the communication device in accordance with at least one of the first and second detection signals.

It is preferable that the first and second operators slide in synchronization with each other.

It is preferable that the first operator slides in a direction opposite to a direction in which the second operator slides.

It is preferable that the first and second operators are slidable independently of each other.

It is preferable that the communication device further includes a non-deformable portion fixed to the device body, the first displaceable section being connected to both the first operator and the non-deformable portion, the second displaceable section being connected to both the second operator and the non-deformable portion, the first displacement detector being located across the non-deformable portion and the first displaceable section, the second displacement detector being located across the non-deformable portion and the second displaceable section.

It is preferable that the communication device further includes first auxiliary displaceable section being connected to both the first operator and the non-deformable portion, and second auxiliary displaceable section being connected to both the second operator and the non-deformable portion.

It is preferable that the first displaceable section is connected to the non-deformable portion at one of upper and lower edges of the non-deformable portion, and the first auxiliary displaceable section is connected to the non-deformable portion at the other edge of the non-deformable portion, and wherein the second displaceable section is connected to the non-deformable portion at one of upper and lower edges of the non-deformable portion at the opposite side to the first displaceable section, and the second auxiliary displaceable section is connected to the non-deformable portion at the other edge of the non-deformable portion at the opposite side to the first auxiliary displaceable section.

It is preferable that the communication device further includes a third displacement detector which detects displacement of the first auxiliary displaceable section and transmits a third detection signal accordingly, and a fourth displacement detector which detects displacement of the second auxiliary displaceable section and transmits a fourth detection signal accordingly.

It is preferable that the communication device further includes a display screen formed with the body, and wherein the controller changes what is displayed in the display screen, in accordance with at least one of the first and second detection signals.

It is preferable that the first and second displacement detector keep transmitting the first and second detection signals while the first and second displaceable sections are kept displaced.

It is preferable that the first and second displacement detectors transmit the first and second detection signals in accordance further with directions in which the first and second displaceable sections are displaced.

It is preferable that the third and fourth displacement detectors transmit the third and fourth detection signals in accordance further with directions in which the third and fourth displaceable sections are displaced.

It is preferable that each of the first and second displacement detectors includes a sensor having a wheatstone bridge structure.

It is preferable that each of the first and second displacement detector transmits the detection signal only when the displacement of each of the first and second displaceable sections is equal to or greater than a threshold displacement.

In another aspect of the present invention, there is provided a method of operating a communication device, including the steps of (a) displacing a displaceable portion of the communication device, (b) transmitting a control signal in accordance with displacement of the displaceable portion, and (c) operating the communication device in accordance with the control signal.

It is preferable that what is displayed in a display screen is changed in accordance with the control signal in the step (c).

It is preferable that the control signal is kept transmitted while the displaceable portion is kept displaced.

It is preferable that displacement of the displaceable portion is comprised of at least one of a degree of expansion or contraction, a degree of deformation, a degree of angular displacement, and a degree of torsion.

It is preferable that the control signal is transmitted in the step (b) in accordance further with a direction in which the displaceable portion is displaced.

It is preferable that the method further includes the step of converting the displacement of the displaceable portion into electric energy.

It is preferable that first to N-th control signals are transmitted in the step (b) in accordance with the displacement of the displaceable section, wherein N is an integer equal to or greater than 2, the communication device being operated in the step (c) at first to N-th rates in response to the first to N-th control signals, respectively.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

First Embodiment

Figure 4:
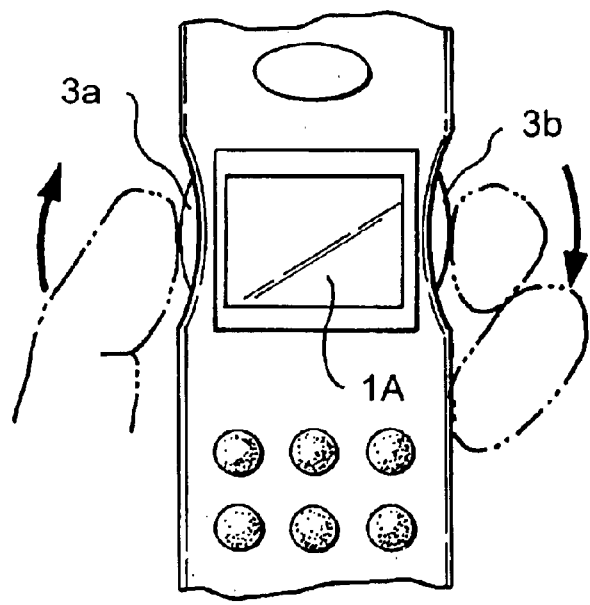
FIG. 4 is a front view illustrating a portable radio-signal communication device in accordance with the first embodiment of the present invention.
Figure 5A:
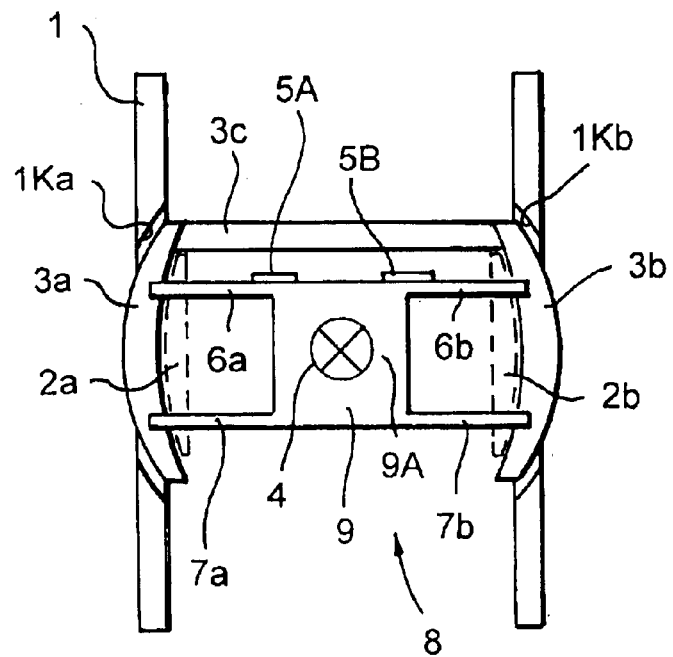
FIG. 5A is a cross-sectional view illustrating an internal structure of the portable radio-signal communication device illustrated in FIG. 4.
Figure 5B:
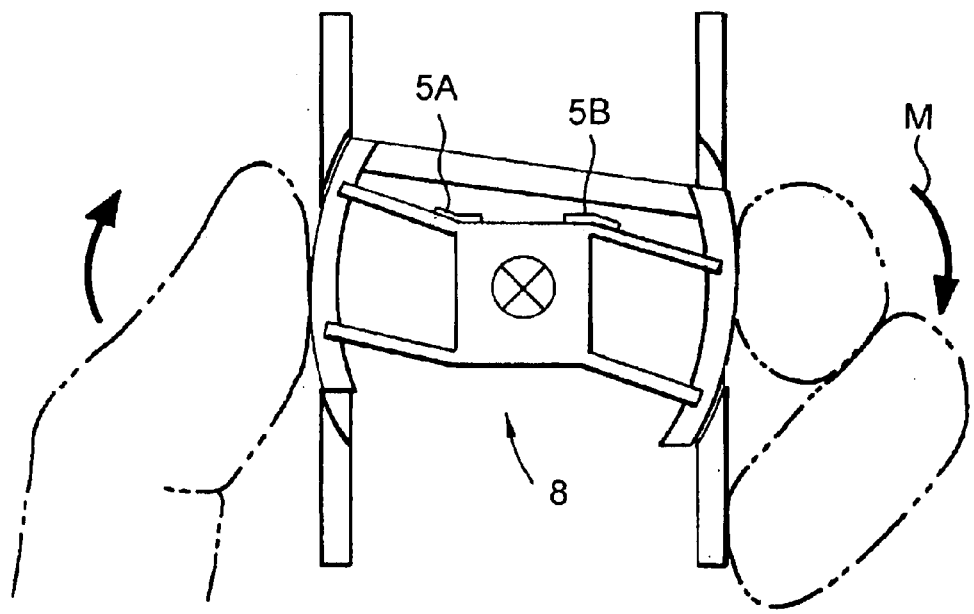
FIG. 5B is a cross-sectional view illustrating an internal structure of the portable radio-signal communication device illustrated in FIG. 4 while the communication device is being operated.

FIG. 4 is a front view of a cellular phone in accordance with the first embodiment of the present invention. FIG. 5A illustrates an internal structure of the cellular phone not in operation, and FIG. 5B illustrates an internal structure of the cellular phone in operation.

As illustrated in FIG. 5A, the cellular phone has a device body 1, and first and second operators 3a and 3b both having an outer arcuate surface partially extending beyond opposite sides of the device body 1. As illustrated in FIGS. 4 and 5B, the first and second operators 3a and 3b are positioned such that when a user holds the cellular phone with his/her hand, his/her fingers naturally make touch with the first and second operators 3a and 3b.

The first and second operators 3a and 3b are located in symmetry with each other about the device body 1.

The first and second operators 3a and 3b are designed to be rotatable relative to the device body 1.

The device body is formed at opposite sides thereof with first and second cut-outs 1ka and 1kb each having an inner arcuate surface having the same curvature as a curvature of the arcuate surface of the first and second operators 3a and 3b. The arcuate surfaces of the first and second operators 3a and 3b are in facing relation to the inner arcuate surface of the first and second cut-outs 1ka and 1kb, and partially project through the first and second cut-outs 1kb.

As illustrated in FIG. 5A, the first and second operators 3a and 3b are connected to each other through a connecting bar 3c. The connecting bar 3c ensures that the first and second operators 3a and 3b rotate in synchronization with each other. Accordingly, when the first operator 3a rotates in a clockwise direction, for instance, the second operator 3b rotates in a counterclockwise direction.

It should be noted that the first and second operators 3a and 3b may be designed to be rotatable independently of each other by not connecting the first and second operators 3a and 3b through the connecting bar 3c.

The cellular phone further includes first and second supporters 2a and 2b located inwardly of the first and second operators 3a and 3b, respectively. The first and second supporters 2a and 2b are fixed to the device body 1. Each of the first and second supporters 2a and 2b is designed to have an arcuate outer surface having the same curvature as a curvature of the arcuate surface of the first and second operators 3a and 3b. Thus, the first and second supporters 2a and 2b can support the first and second operators 3a and 3b thereon for smooth rotation, respectively.

In addition, when a compressive force directed inwardly of the cellular phone is applied to the first and second operators 3a and 3b, the first and second supporters 2a and 2b act as a stopper to prevent the first and second operators 3a and 3b from being deformed inwardly of the cellular phone.

The cellular phone further includes a deformation detecting unit 9. The deformation detecting unit 9 is comprised of a rectangular non-deformable body 9A fixed to the device body 1 by means of a pin 4, a first deformable section 6a connected to both the first operator 3a and the non-deformable body 9A, and deformed by the first operator 3a, a second deformable section 6b connected to both the second operator 3b and the non-deformable body 9A, and deformed by the second operator 3b, a first auxiliary deformable section 7a connected to both the first operator 3a and the non-deformable body 9A, and deformed by the first operator 3a, a second auxiliary deformable section 7b connected to both the second operator 3b and the non-deformable body 9A, and deformed by the second operator 3b, a first deformation detector 5A which is located across the non-deformable body 9A and the first deformable section 6a, and which detects deformation of the first deformable section 6a and transmits a first detection signal accordingly, a second deformation detector 5B which is located across the non-deformable body 9A and the second deformable section 6b, and which detects deformation of the second deformable section 6b and transmits a second detection signal accordingly, and a controller 8 which operates the communication device in accordance with the first and second detection signals.

The first and second deformable detectors 5A and 5B keep transmitting the first and second detection signals while the first and second deformable sections 6a and 6b are kept deformed.

As illustrated in FIG. 5A, the first deformable section 6a is connected to the non-deformable body 9A at a left side and at an upper edge of the non-deformable body 9A, and the first auxiliary deformable section 7a is connected to the non-deformable body 9A at a left side and at a lower edge of the non-deformable body 9A. The second deformable section 6b is connected to the non-deformable body 9A at a right side and at an upper edge of the non-deformable body 9A, and the second auxiliary deformable section 7b is connected to the non-deformable body 9A at a right side and at a lower edge of the non-deformable body 9A.

Though not illustrated, the communication device may be designed to further include a third deformation detector which is located across the non-deformable body 9A and the first auxiliary deformable section 7a, and which afetects deformation of the first auxiliary deformable section 7a and transmits a third detection signal accordingly, and a fourth deformation detector which is located across the non-deformable body 9A and the second auxiliary deformable section 7b, and which detects deformation of the second auxiliary deformable section 7b and transmits a fourth detection signal accordingly.

As illustrated in FIG. 5B, when the first and second operators 3a and 3b are made to rotate, the non-deformable body 9A is kept non-deformed. When the first and second operators 3a and 3b are made to rotate, the first and second deformable sections 6a and 6b and the first and second auxiliary deformable sections 7a and 7b follow the first and second operators 3a and 3b. As a result, stress is concentrated at proximal ends of the first and second deformable sections 6a and 6b and the first and second auxiliary deformable sections 7a and 7b, and thus, the proximal ends of the sections 6a, 6b, 7a and 7b are made deformed.

Specifically, when the first and second operators 3a and 3b are made to rotate in a clockwise direction indicated with an arrow M, a shrinkage force exerts on the first deformation detector 5A, and a tensile force exerts on the second deformation detector 5B.

The first and second deformation detectors 5A and 5B convert displacement thereof caused by the shrinkage and tensile forces, into electric energy, and transmits the first and second detection signals accordingly.

When the first and second operators 3a and 3b are made to rotate, the controller 8 incorporated in the device body 1 and connected to the first and second operators 3a and 3b detects an angular moment generated by the first and second operators 3a and 3b, as displacement of the first and second deformable portions 6a and 6b, based on the first and second detection signals transmitted from the first and second deformation detectors 5A and 5B.

The controller 8 accomplishes one of functions of the cellular phone in accordance with the thus detected angular moment. For instance, the controller 8 scrolls what is displayed in a display screen 1A (see FIG. 4) in accordance with a magnitude of the detected angular moment. If the detected angular moment is positive in a direction or if the first and second operators 3a and 3b are made to rotate in a clockwise direction, what is displayed in the display screen 1A is upwardly scrolled, whereas if the detected angular moment is negative in a direction or if the first and second operators 3a and 3b are made to rotate in a counterclockwise direction, what is displayed in the display screen 1A is downwardly scrolled.

Figure 6:
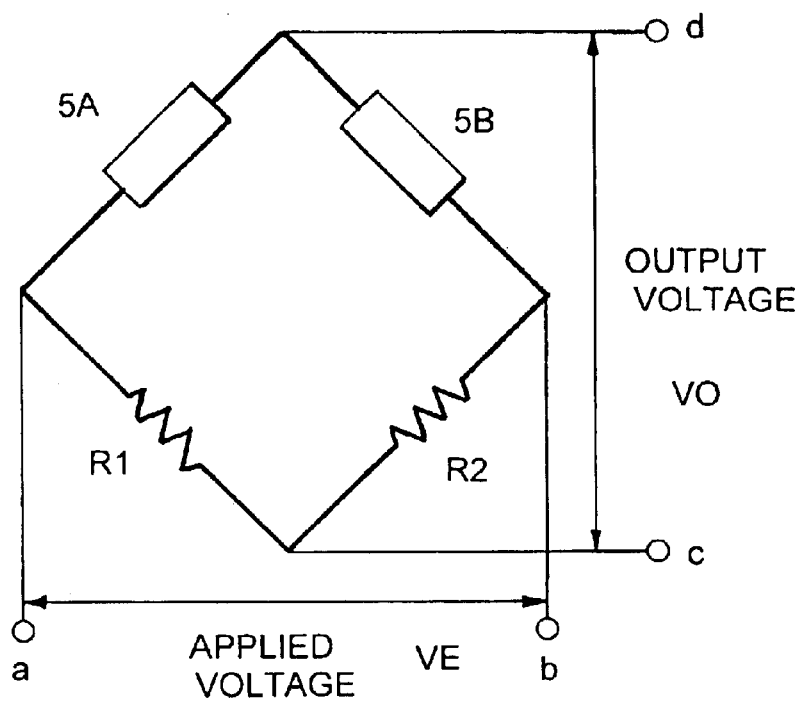
FIG. 6 is a circuit diagram of a displacement detector used in the communication device illustrated in FIG. 4.

FIG. 6 is a circuit diagram of a circuit included in the controller 8. The illustrated circuit has a wheatstone bridge structure.

In the circuit illustrated in FIG. 6, it is assumed that there is generated an output voltage VO between c and d, when a voltage VE is applied across a and b. As the first and second deformable sections 6a and 6b are deformed, resistances of the first and second deformation detectors 5A and 5B vary, resulting in that the output voltage VO between c and d also varies. By measuring the output voltage VO, it is possible to measure a force exerting on the first and second operators 3a and 3b.

As illustrated in FIG. 5B, the first and second deformation detectors 5A and 5B are deformed in opposite directions. Hence, the controller 8 could have better sensitivity than that of a controller including only one deformation detector.

Figure 7:
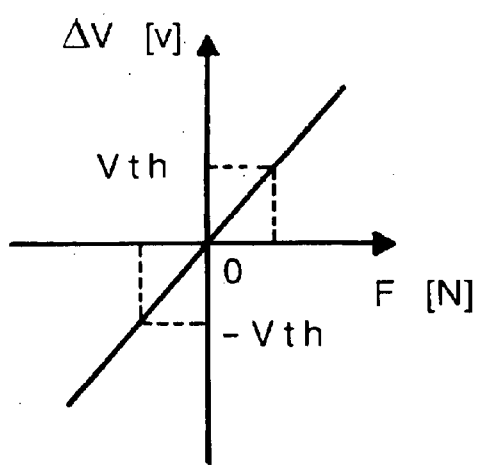
FIG. 7 is a graph showing a characteristic of a displacement detector used in the communication device illustrated in FIG. 4.

As illustrated in FIG. 7, variation □V of the output voltage VO is in proportion to a force F exerting on the controller 8. For instance, if it is assumed that when an angular moment M is applied to the first and second operators 3a and 3b in a clockwise direction, the variation □V is positive, when an angular moment (−M) is applied to the first and second operators 3a and 3b in a counterclockwise direction, the variation □V is negative.

Figure 8:
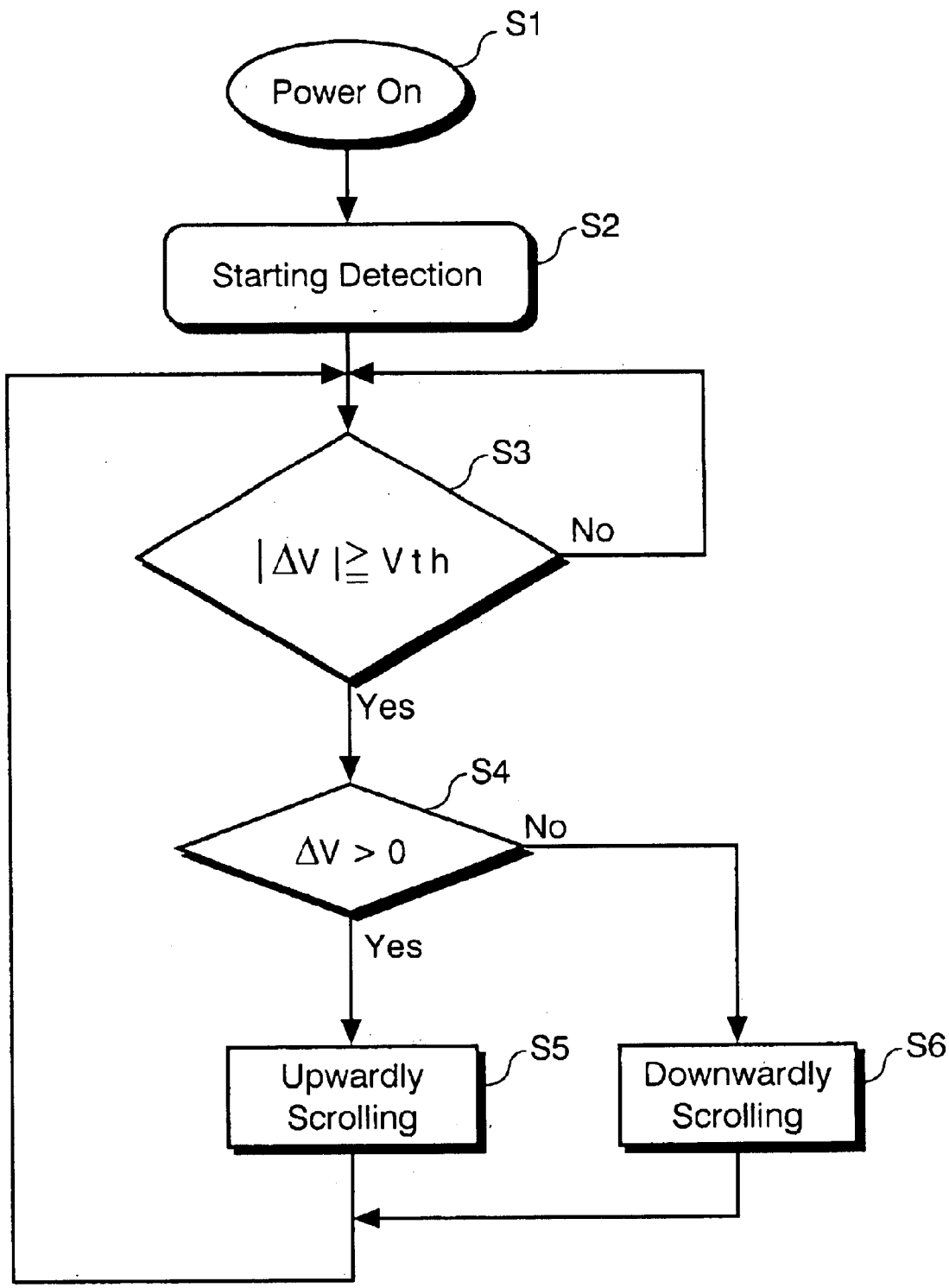
FIG. 8 is a flow chart illustrating an operation of the communication device in accordance with the first embodiment.

FIG. 8 is a flow chart showing an operation of the cellular phone in accordance with the first embodiment.

When the cellular phone is powered on in step S1, the first and second deformation detectors 5A and 5B start detecting deformation of the first and second deformable sections 6a and 6b in step S2.

When the controller 8 detects the variation □V of the output voltage VO, the controller 8 checks whether an absolute value of the variation □V is equal to or greater than a predetermined threshold voltage Vth, in step S3.

If the absolute value of the variation □V is smaller than a predetermined threshold voltage Vt (NO in step S3), the controller 8 repeats the step S3.

If the absolute value of the variation □V is equal to or greater than a predetermined threshold voltage Vt (YES in step S3), the controller 8 then checks whether the variation □V is positive or negative, in step S4.

If the variation □V is positive (YES in step S4), the controller 8 upwardly scrolls what is displayed in the display screen 1A, in step S5.

If the variation □V is negative (NO in step S4), the controller 8 downwardly scrolls what is displayed in the display screen 1A, in step S6.

Figure 1:
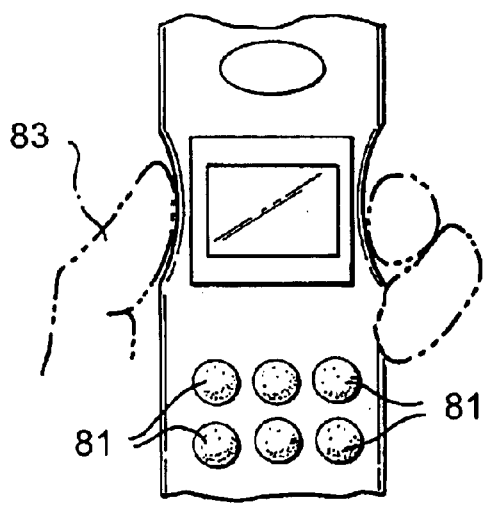
FIG. 1 is a front view illustrating a first example of a conventional portable radio-signal communication device.
Figure 2:
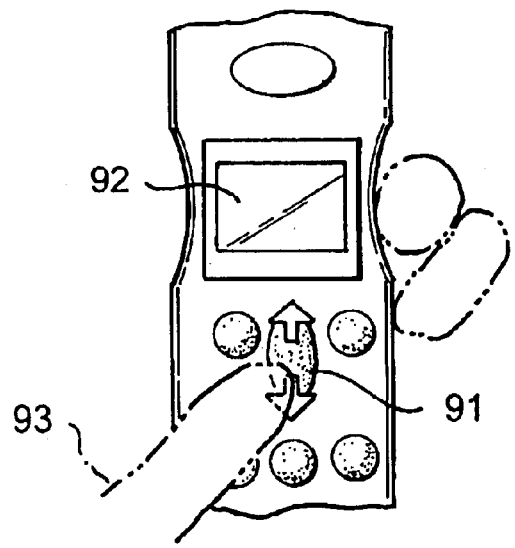
FIG. 2 is a front view illustrating a second example of a conventional portable radio-signal communication device.
Figure 3:
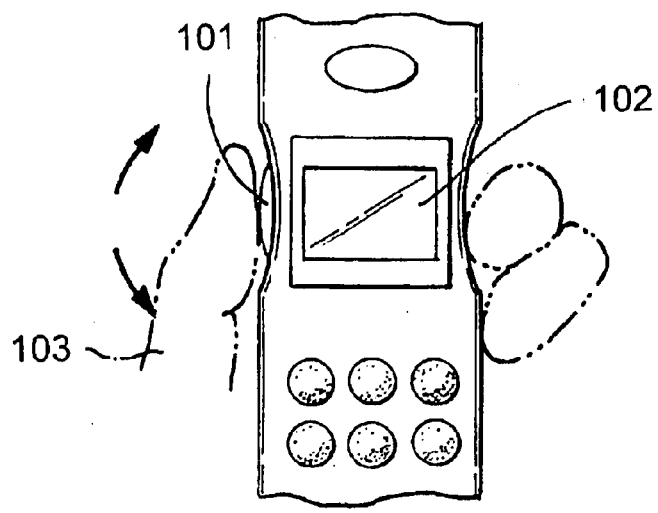
FIG. 3 is a front view illustrating a third example of a conventional portable radio-signal communication device.

As explained above, when a force equal to or greater than a force corresponding to the threshold voltage Vth is applied to the first and second operators 3a and 3b, what is displayed in the display screen 1A is successively scrolled. Hence, a user does no longer have to push the operation keys 81 or 91 many time unlike the conventional cellular phones illustrated in FIGS. 1 and 2.

Though the comparison between the variation □V and the threshold voltage Vth in step S3 is carried out by the controller 8 in the first embodiment, the comparison may be carried out by a micro-processor generally equipped in a cellular phone. The threshold voltage Vth is experimentally or theoretically calculated in advance, and is stored in a memory equipped in the cellular phone.

The above-mentioned first embodiment provides advantages as follows.

First, since the variation □V can be kept generated if the first and second operators 3a and 3b are kept rotated, , a user can readily operate the cellular phone while a user naturally holds the cellular phone.

Second, since the first and second operators 3a and 3b are located in symmetry with each other, a user can operate the first and second operators 3a and 3b with either a right or left hand.

In the above-mentioned first embodiment, though each of the first and second deformation detectors 5A and 5B is designed to transmit a constant detection signal, they may be designed to transmit a varying detection signal. For instance, each of the first and second deformation detectors 5A and 5B may transmit first to N-th detection signals in accordance with a degree of deformation of each of the first and second deformable sections 6a and 6b, respectively. Herein, N is an integer equal to or greater than 2.

In the above-mentioned case, the controller 8 changes what is displayed in the display screen 1A at first to N-th rates in response to the first to N-th detection signals, respectively.

Second Embodiment

Figure 9:
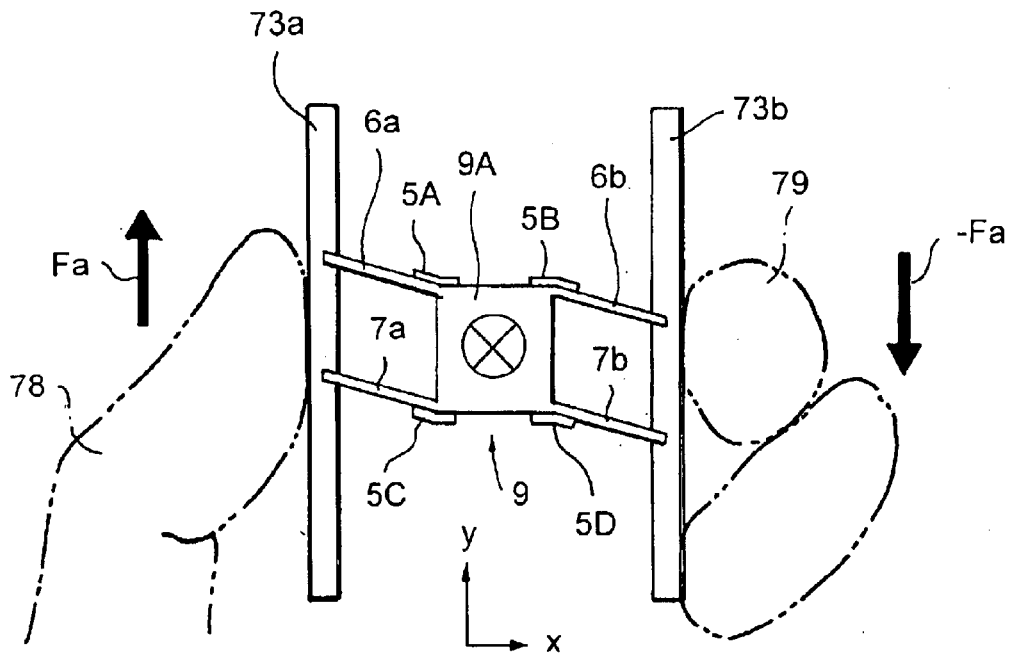
FIG. 9 is a cross-sectional view illustrating a portable radio-signal communication device in accordance with the second embodiment of the present invention in operation.

FIG. 9 illustrates an internal structure of a cellular phone in accordance with the second embodiment.

As illustrated in FIG. 9, the cellular phone has a device body (not illustrated), and first and second operators 73a and 73b both designed to be slidable along opposite sides of the device body. The first and second operators 73a and 73b are positioned such that when a user holds the cellular phone with his/her hand, his/her fingers naturally make touch with the first and second operators 73a and 73b.

The first and second operators 73a and 73b are located in symmetry with each other about the device body 1.

The cellular phone further includes a deformation detecting unit 9. The deformation detecting unit 9 is comprised of a rectangular non-deformable body 9A fixed to the device body by means of a pin, a first deformable section 6a connected to both the first operator 73a and the non-deformable body 9A, and deformed by the first operator 73a, a second deformable section 6b connected to both the second operator 73b and the non-deformable body 9A, and deformed by the second operator 73b, a first auxiliary deformable section 7a connected to both the first operator 73a and the non-deformable body 9A, and deformed by the first operator 73a, a second auxiliary deformable section 7b connected to both the second operator 73b and the non-deformable body 9A, and deformed by the second operator 73b, a first deformation detector 5A which is located across the non-deformable body 9A and the first deformable section 6a, and which detects deformation of the first deformable section 6a and transmits a first detection signal accordingly, a second deformation detector 5B which is located across the non-deformable body 9A and the second deformable section 6b, and which detects deformation of the second deformable section 6b and transmits a second detection signal accordingly, a third deformation detector 5C which is located across the non-deformable body 9A and the first auxiliary deformable section 7a, and which detects deformation of the first auxiliary deformable section 7a and transmits a third detection signal accordingly, a fourth deformation detector 5D which is located across the non-deformable body 9A and the second auxiliary deformable section 7b, and which detects deformation of the second auxiliary deformable section 7b and transmits a fourth detection signal accordingly, and a controller which operates the communication device in accordance with the first to fourth detection signals.

The first to fourth deformable detectors 5A to 5D keep transmitting the first to fourth detection signals while the first and second deformable sections 6a and 6b and the first and second auxiliary deformable sections 7a and 7b are kept deformed.

In the second embodiment, since the first and second operators 3a and 3b are connected to each other through the deformation detecting unit 9, the first and second deformable sections 6a and 6b and the first and second auxiliary deformable sections 7a and 7b are deformed in synchronization with each other, but in opposite directions.

As illustrated in FIG. 9, the first deformable section 6a is connected to the non-deformable body 9A at a left side and at an upper edge of the non-deformable body 9A, and the first auxiliary deformable section 7a is connected to the non-deformable body 9A at a left side and at a lower edge of the non-deformable body 9A. The second deformable section 6b is connected to the non-deformable body 9A at a right side and at an upper edge of the non-deformable body 9A, and the second auxiliary deformable section 7b is connected to the non-deformable body 9A at a right side and at a lower edge of the non-deformable body 9A.

In brief, the cellular phone in accordance with the second embodiment is structurally different from the cellular phone in accordance with the first embodiment in that the first and second operators 3a and 3b are replaced with the first and second operators 73a and 73b. Since the first and second operators 73a and 73b are in the form of a flat plate, it is not necessary for the cellular phone in accordance with the second embodiment to have the supporters 2a and 2b and the cut-outs 1ka and 1kb.

In the cellular phone illustrated in FIG. 9, the controller detects vertical displacement of the first and second operators 73a and 73b which is made when a force Fa is applied to the first operator 73a.

In the cellular phone illustrated in FIG. 9, when a user upwardly slides the first operator 73a with a thumb 78 by a certain length, the second operator 73b is downwardly slid with an index finger 79 by the same length in synchronization with the first operator 73a. To the contrary, when a user upwardly slides the second operator 73b with an index finger 79 by a certain length, the first operator 73a is downwardly slid with a thumb 78 by the same length in synchronization with the second operator 73b.

It should be noted that the first and second operators 73a and 73b may be designed to slide independently of each other to thereby make different displacements from each other.

Figure 10:
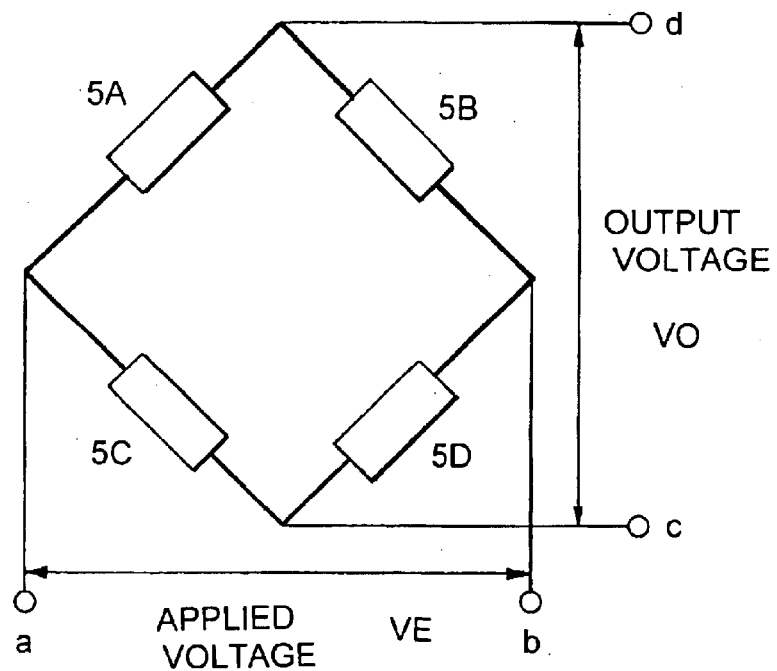
FIG. 10 is a circuit diagram of a displacement detector used in the communication device in accordance with the second embodiment of the present invention.

FIG. 10 is a circuit diagram of a circuit constituted by the first to fourth deformation detectors 5A to 5D. The illustrated circuit has a wheatstone bridge structure like the circuit illustrated in FIG. 6. In the second embodiment, since the facing first and second deformation detectors 5A to 5B are deformed in opposite directions, and in addition, the facing first and second auxiliary deformation detectors 5C to 5D are deformed in opposite directions, the circuit can have higher sensitivity than that of the circuit illustrated in FIG. 6, and hence, can detect displacements of the first and second operators 73a and 73b more accurately than the circuit illustrated in FIG. 6.

As having been illustrated in FIG. 7, the variation $\Box V$ of the output voltage VO is in proportion to a force F applied to the first and second operators 73a and 73b. By determining a plurality of threshold voltages, it would be possible to gradually change a rate at which what is displayed in the display screen 1A is scrolled. That is, if a greater force is applied to the first and second operators 73a and 73b, what is displayed in the display screen 1A is scrolled at a greater rate, and to the contrary, if a smaller force is applied to the first and second operators 73a and 73b, what is displayed in the display screen 1A is scrolled at a smaller rate.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 11-105921 filed on Apr. 13, 1999 including specification, claims, drawings and summary is incorporated herein by reference in its entirety.

What is claimed is:

1. A communication device comprising:
   (a) a device body;
   (b) an operator formed with said device body;
   (c) a displaceable section which is displaced by said operator;
   (d) a displacement detector which transmits a control signal in accordance with displacement of said displaceable section;
   (e) a controller which operates said communication device in accordance with said control signal; and
   (f) a supporter fixed to said device body and having an arcuate outer surface having the same curvature as a curvature of an inner arcuate surface of said operator, said supporter supporting said operator thereon for rotation.

2. The communication device as set forth in claim 1, wherein said controller selects one of functions of said communication device in accordance with said control signal.

3. The communication device, set forth in claim 1, wherein said displacement detector transmits first to N-th control signals in-accordance with said displacement of said displaceable section, wherein N is an integer equal to or greater than 2, said controller operating said communication device at first to N-th rates in response to said first to N-th control signals, respectively.

4. The communication device as set forth in claim 1, further comprising a display screen formed with said body, and wherein said controller changes what is displayed in said display screen, in accordance with said control signal.

5. The communication device as set forth in claim 1, wherein said communication device includes two operators which are formed at opposite sides of said communication device.

6. The communication device as set forth in claim 1, wherein said displacement detector keeps transmitting said control signal while said displaceable section is kept displaced.

7. The communication device as set forth in claims 1, wherein said displacement of said displaceable section is comprised of at least one of a degree of or contraction, a degree of deformation, a degree of angular displacement, and a degree of torsion.

8. The communication device as set forth in claim 1, wherein said displacement detector transmits said control signal in accordance further with a direction in which said displaceable section is displaced.

9. The communication device as set forth in claim 1, further comprising a converter which converts said displacement of said displaceable section into electric energy.

10. The communication device as set forth in claim 1, wherein said displaceable section is composed of elastic material deformable by said operator.

11. The communication device as set forth in claim 1, wherein said operator is designed to be rotatable relative to said device body and to extend beyond opposite sides of said device body.

12. The communication device as set forth in claim 11, wherein said communication device includes two operators having arcuate surfaces symmetrical with each other about a center of said device body.

13. The communication device as set forth in claim 1, wherein said operator includes a non-displaceable section which is not displaced by said operator, said communication device further comprising a deformation detector which is connected to both of said displaceable section and said non-displaceable section to thereby detect deformation of said displaceable section and transmit a detection signal in accordance with the thus detected deformation, said displacement detector transmitting said control signal in accordance with said detection signal.

14. The communication device as set forth in claim 13, wherein said communication device includes two deformation detectors located horizontally symmetrical with each other about a center of said device body.

15. The communication device as set forth in claim 13, wherein said communication device includes four deformation detectors located horizontally and vertically symmetrical with one another about a center of said device body.

16. The communication device as set forth in claim 15, wherein said displacement detector includes a sensor having a wheatstone bridge structure.

17. The communication device as set forth in claim 1, wherein said operator is formed integral with said device body.

18. A communication device comprising:
  (a) a device body;
  (b) at least one operator having an outer arcuate surface partially extending beyond said device body, and rotatable relative to said device body;
  (c) a displaceable section which is displaced by said operator;
  (d) a displacement detector which detects displacement of said displaceable section and transmits a detection signal accordingly;
  (e) a controller which operates said communication device in accordance with said detection signal; and
  (f) a supporter fixed to said device body and having an arcuate outer surface having the same curvature as a curvature of an inner arcuate surface of said operator, said supporter supporting said operator thereon for rotation.

19. The communication device as set forth in claim 18, wherein said device body is formed with a cut-out having an inner arcuate surface having the same curvature as a curvature of said outer arcuate surface of said operator, said outer arcuate surface of said operator being in facing relation to said inner arcuate surface of said cut-out.

20. The communication device as set forth in claim 18, wherein said displacement detector includes:
  (a) a non-deformable portion fixed to said device body;
  (b) an deformable portion connecting said non-deformable portion to said operator; and
  (c) a deformation detecting device located across said non-deformable portion and said deformable portion for detecting a degree of deformation of said deformable portion.

21. The communication device as set forth in claim 20, wherein said displacement detector further includes an auxiliary deformable portion connecting said non-deformable portion to said operator, said deformable portion connecting to said non-deformable portion at one of upper and lower edges of said non-deformable portion, said auxiliary deformable portion connecting to said non-deformable portion at the other edge of said non-deformable portion.

22. The communication device as set forth in claim 21, further comprising a second deformation detecting device located across said non-deformable portion and said auxiliary deformable portion for detecting a degree of deformation of said auxiliary deformable portion.

23. The communication device as set forth in claim 18, further comprising a display screen formed with said body, and wherein said controller changes what is displayed in said display screen, in accordance with said detection signal.

24. The communication device as set forth in claim 23, wherein said displacement detector transmits first to N-th detection signals in accordance with said displacement of said displaceable section, wherein N is an integer equal to or greater than 2, said controller changes what is displayed in said display screen at first to N-th rates in response to said first to N-th detection signals, respectively.

25. The communication device as set forth in claim 18, wherein said displacement detector keeps transmitting said detection signal while said displaceable section is kept displaced.

26. The communication device as set forth in claim 18, wherein said displacement detector transmits said detection signal in accordance further with a direction in which said displaceable section is displaced.

27. The communication device as set forth in claim 18, wherein said displacement detector transmits first to N-th detection signals in accordance with said displacement of said displaceable section, wherein N is an integer equal to or greater than 2, said controller operates said communication device, at first to N-th rates in response to said first to N-th detection signals, respectively.

28. The communication device as set forth in claim 18, wherein said displacement detector includes a sensor having a wheatstone bridge structure.

29. The communication device as set forth in claim 18, wherein sad displacement detector transmits said detection signal only when said displacement of said displaceable section is equal to or greater than a threshold displacement.

30. A communication device comprising:
(a) device body;
(b) first operator having an outer arcuate surface partially extending beyond said device body, and rotatable relative to said device boby,
(c) a second operator having an outer arcuate surface partially extending beyond said device body, and rotatable relative to said device body, said first and second operators being formed at opposite sides of said communication device;
(d) a first displaceable section which is displaced by said first operator;
(e) a second displaceable section which is displaced by said second operator;
(f) a first displacement detector which detects displacement of said first displaceable section and transmits a first detection signal accordingly;
(g) a second displacement detector which detects displacement of said second displaceable section and transmits a second detection signal accordingly; and
(h) a controller which operates said communication device in accordance with at least one of said first and second detection signals.

31. The communication device as set forth in claim 30, wherein said first and second operators rotate in synchronization with each other.

32. The communication device as set forth in claim 31, wherein said first operator rotates in a direction opposite to a direction in which said second operator rotates.

33. The communication device as set forth in claim 32, wherein said first and second operators are rotatable independently of each other.

34. The communication device as set forth in claim 33, further comprising first and second supporters fixed to said device body and each having an arcuate outer surface having the same curvature as a curvature of an inner arcuate surface of each of said first and second operators, said first and second supporters supporting said first and second operators thereon for rotation, respectively.

35. The communication device as set forth in claim 30, wherein said device body is formed with first and second cut-outs each having an inner arcuate surface having the same curvature as a curvature of said outer arcuate surface of each of said first and second operators, said outer arcuate surface of each of said first and second operators being in facing relation to said inner arcuate surface of each of said first and second cut-outs, respectively.

36. The communication device as set forth in claim 30, further comprising a non-deformable portion fixed to said device body, said first displaceable section being connected to both said first operator and said non-deformable portion, said second displaceable section being connected to both said second operator and said non-deformable portion, said first displacement detector being located across said non-deformable portion and said first displaceable section, said second displacement detector being located across said non-deformable portion and said second displaceable section.

37. The communication device as set forth in claim 36, further comprising a first auxiliary displaceable section being connected to both said first operator and said non-deformable portion, and a second auxiliary displaceable section being connected to both said second operator and said non-deformable portion.

38. The communication device as set forth in claim 37, wherein said first displaceable section is connected to said non-deformable portion at one of upper and lower edges of said non-deformable portion, and said first auxiliary displaceable section is connected to said non-deformable portion at the other edge of said non-deformable portion, and wherein said second displaceable section is connected to said non-deformable portion at one of upper and lower edges of said non-deformable portion at the opposite side to said first displaceable section, and said second auxiliary displaceable section is connected to said non-deformable portion at the other edge of said non-deformable portion at the opposite side to said first auxiliary displaceable section.

39. The communication device as set forth in claim 37, further comprising:
a third displacement detector which detects displacement of said first auxiliary displaceable section and transmits a third detection signal accordingly, and
a fourth displacement detector which detects displacement of said second auxiliary displaceable section and transmits a fourth detection signal accordingly.

40. The communication device as set forth in claim 39, wherein said third and fourth displacement detectors transmit said third and fourth detection signals in accordance further with directions in which said third and fourth displaceable sections are displaced.

41. The communication device as set forth in claim 30, further comprising a display screen formed with said body, and wherein said controller changes what is displayed in said display screen, in accordance with at least one of said first and second detection signals.

42. The communication device as set forth in claim 41 wherein each of said first and second displacement detectors transmits first to N-th detection signals in accordance with said displacement of each of said first and second displaceable sections, respectively, wherein N is an integer equal to or greater than 2, said controller changes what is displayed in said display screen, at first to N-th rates in response to said first to N-th detection signals, respectively.

43. The communication device as set forth in claim 30, wherein said first and second displacement detector keep transmitting said first and second detection signals while said first and second displaceable sections are kept displaced.

44. The communication device as set forth in claim 30, wherein said first and second displacement detectors transmit said first and second detection signals in accordance further with directions in which said first and second displaceable sections are displaced.

45. The communication device as set forth in claim 30, wherein each of said first and second displacement detectors transmits first to N-th detection signals in accordance with said displacement of each of said first and second displaceable sections, respectively, wherein N is an integer equal to or greater than 2, said controller operates said communication device at first to N-th rates in response to said first to N-th detection signals, respectively.

46. The communication device as set forth in claim 30, wherein each of said first and second displacement detectors includes a sensor having a wheatstone bridge structure.

47. The communication device as set forth in claim 30, wherein each of said first and second displacement detector transmits said detection signal only when said displacement of each of said first and second displaceable sections is equal to or greater than a threshold displacement.

48. A communication device comprising:
(a) a device body;
(b) at least one operator slidable relative to said device body;

(c) a displaceable section which is displaced by said operator;
(d) a displacement detector which detects displacement of said displaceable section and transmits a detection signal accordingly;
(e) a controller which operates said communication device in accordance with said detection signal, and
(f) a supporter fixed to said device body and having an arcuate outer surface having the same curvature as a curvature of an inner arcuate surface of said operator, said supporter supporting said operator thereon for rotation.

49. The communication device as set forth in claim 48, wherein said displacement detector includes:
(a) a non-deformable portion fixed to said device body;
(b) an deformable portion connecting said non-deformable portion to said operator; and
(c) a deformation detecting device located across said non-deformable portion and said deformable portion for detecting a degree of deformation of said deformable portion.

50. The communication device as set forth in claim 49, wherein said displacement detector further includes an auxiliary deformable portion connecting said non-deformable portion to said operator, said deformable portion connecting to said non-deformable portion at one of upper and lower edges of said non-deformable portion, said auxiliary deformable portion connecting to said non-deformable portion at the other edge of said non-deformable portion.

51. The communication device as set forth in claim 49, further comprising a second deformation detecting device located across said non-deformable portion and said auxiliary deformable portion for detecting a degree of deformation of said auxiliary deformable portion.

52. The communication device as set forth in claim 48, further comprising a display screen formed with said body, and wherein said controller changes what is displayed in said display screen, in accordance with said detection signal.

53. The communication device as set forth in claim 48, wherein said displacement detector transmits first to N-th detection signals in accordance with said displacement of said displaceable section, wherein N is an integer equal to or greater than 2, controller changes what is displayed in said display screen at first to N-th rates in response to said first to N-th detection signals, respectively.

54. The communication device as set forth in claim 48, wherein said displacement detector keeps transmitting said detection signal while said displaceable section is kept displaced.

55. The communication device as set forth in claim 48, wherein said displacement detector transmits said detection signal in accordance further with a direction in which said displaceable section is displaced.

56. The communication device as set forth in claim 48, wherein said displacement detector transmits first to N-th detection signals in accordance with said displacement of said displaceable section, wherein N is an integer equal to or greater than 2, said controller operates said communication device, at first to N-th rates in response to said first to N-th detection signals, respectively.

57. The communication device as set forth in claim 48, wherein said displacement detector includes a sensor having a wheatstone bridge structure.

58. The communication device as set forth in claim 48, wherein said displacement detector transmits said detection signal only when said displacement of said displaceable section is equal to or greater than a threshold displacement.

59. A communication device comprising:
(a) a device body;
(b) a first operator slidable relative to said device body;
(c) a second operator slidable relative to said device body, said first and second operators being formed at opposite sides of said communication device;
(d) a first displaceable section which is displaced by said first operator;
(e) a second displaceable section which is displaced by said second operator;
(f) a first displacement detector which detects displacement of said first displaceable section and transmits a first detection signal accordingly;
(g) a second displacement detector which detects displacement of said second displaceable section and transmits a second detection signal accordingly; and
(h) a controller which operates said communication device in accordance with at least one of said first and second detection signal.

60. The communication device as set forth in claim 59, wherein said first and second operators slide in synchronization with each other.

61. The communication device as set forth in claim 60, wherein said first operator slides in a direction opposite to a direction in which said second operator slides.

62. The communication device as set forth in claim 59, wherein said first and second operators, are slidable independently of each other.

63. The communication device as set forth in claim 59, further comprising a non-deformable portion fixed to said device body, said first displaceable section being connected to both said first operator and said non-deformable portion, said second displaceable section being connected to both said second operator and said non-deformable portion, said first displacement detector being located across said non-deformable portion and said first displaceable section, said second displacement detector being located across said non-deformable portion and said second displaceable section.

64. The communication device as set forth in claim 65, further comprising first auxiliary displaceable section being connected to both said first operator and said non-deformable portion, and second auxiliary displaceable section being connected to both said second operator and said non-deformable portion.

65. The communication device as set forth in claim 64, wherein said first displaceable section is connected to said non-deformable portion at one of upper and lower edges of said non-deformable portion, and said first auxiliary displaceable section is connected to said non-deformable portion at the other edge of said non-deformable portion, and wherein said second displaceable section is connected to said non-deformable portion at one of upper and lower edges of said non-deformable portion at the opposite side to said first displaceable section, and said second auxiliary displaceable section is connected to said non-deformable portion at the other edge of said non-deformable portion at the opposite side to said first auxiliary displaceable section.

66. The communication device as set forth in claim 64, further comprising:
a third displacement detector which detects displacement of said first auxiliary displaceable section and transmits a third detection signal accordingly, and
a fourth displacement detector which detects displacement of said second auxiliary displaceable section and transmits a fourth detection signal accordingly.

67. The communication device as set forth in claim 66, wherein said third and fourth displacement detectors transmit said third and fourth detection signals in accordance further with directions in which said third and fourth displaceable sections are displaced.

68. The communication device as set forth in claim 59, further comprising a display screen formed with said body, and wherein said controller changes what is displayed in said display screen, in accordance with at least one of said first and second detection signals.

69. The communication device as set forth in claim 68, wherein each of said first and second displacement detectors transmits first to N-th detection signals in accordance with said displacement of each of said first and second displaceable sections, respectively, wherein N is an integer equal to or greater than 2, said controller changes what is displayed in said display screen, at first to N-th rates in response to said first to N-th detection signals, respectively.

70. The communication device as set forth in claim 59, wherein said first and second displacement detector keep transmitting said first and second detection signals while said first and second displaceable sections are kept displaced.

71. The communication device as set forth in claim 59, wherein said first and second displacement detectors transmit said first and second detection signals in accordance further with directions in which said first and second displaceable sections are displaced.

72. The communication device as set forth in claim 59, wherein each of said first and second displacement detectors transmits first to N-th detection signals in accordance with said displacement of each of said first and second displaceable sections, respectively, wherein N is an integer equal to or greater than 2, said controller operates said communication device at first to N-th rates in response to said first to N-th detection signals, respectively.

73. The communication device as set forth in claim 59, wherein each of said first and second displacement detectors includes a sensor having a wheatstone bridge structure.

74. The communication device as set forth in claim 59, wherein each of said first and second displacement detector transmits said detection signal only when said displacement of each of said first and second displaceable sections is equal to or greater than a threshold displacement.

75. A method of operating a communication device, comprising the steps of:
(a) operating an operator of the communication device, said communication device having a supporter fixed to a device body of said communication device, said supporter having an arcuate outer surface having the same curvature as a curvature of an inner arcuate surface of said operator, said supporter supporting said operator thereon for rotation;
(b) displacing a displaceable portion of said communication device displaced by said operator;
(c) transmitting a control signal in accordance with displacement of said displaceable portion; and
(d) controlling said communication device in accordance with said control signal.

76. The method as set forth in claim 75, wherein what is displayed in a display screen is changed in accordance with said control signal in said step [[(c)]] (d).

77. The method as set forth in claim 75, wherein said control signal is kept transmitted while said displaceable portion is kept displaced.

78. The method as set forth in claims 75, wherein displacement of said displaceable portion is comprised of at least one of a degree of expansion or contraction, a degree of deformation, a degree of angular displacement, and a degree of torsion.

79. The method as set forth in claim 76, wherein said control signal is transmitted in said step (c) in accordance further with a direction in which said displaceable portion is displaced.

80. The method as set forth in claim 75, further comprising the step of converting said displacement of said displaceable portion into electric energy.

81. The method as set forth in claim 76, wherein first to N-th control signals are transmitted in said step (c) in accordance with said displacement of said displaceable section, wherein N is an integer equal to or greater than 2, said communication device being operated controlled in said step (d) at first to N-th rates in response to said first to N-th control signals, respectively.

\* \* \* \* \*